United States Patent [19]

Krewalk et al.

[11] Patent Number: 4,682,091
[45] Date of Patent: Jul. 21, 1987

[54] TELESCOPE CONTROL SYSTEM

[75] Inventors: John J. Krewalk, West Lake Village, Calif.; Eric C. Silverberg, Austin, Tex.

[73] Assignee: Bausch & Lomb Incorporated, Rochester, N.Y.

[21] Appl. No.: 787,748

[22] Filed: Oct. 15, 1985

[51] Int. Cl.$^4$ ............................................. G05B 19/40
[52] U.S. Cl. ................................... 318/685; 318/696; 318/603; 350/568
[58] Field of Search ....................... 318/685, 696, 603; 350/568; 364/474

[56] References Cited

U.S. PATENT DOCUMENTS 4,142,139  2/1979  Slaats et al. ........................ 318/603
4,401,931  8/1983  Kulterman et al. ................ 318/696

Primary Examiner—William M. Shoop, Jr.
Assistant Examiner—Saul M. Bergmann
Attorney, Agent, or Firm—DeWitt M. Morgan

[57] ABSTRACT

A telescope control system is set forth for controlling the orientation of a telescope under control of a microprocessor. The telescope control includes drives to pivot the telescope about each of the declination (altitude) and right ascension (azimuth) axes in stepped increments, each increment corresponding to a control pulse. The microprocessor generates and issues the control pulses from stored data to position the telescope for viewing a selected celestial object. Control pulses are based upon and counted from an index position and/or the preceding position of the telescope. Manual override is provided, the microprocessor accounting for pulses generated during manual override.

18 Claims, 10 Drawing Figures

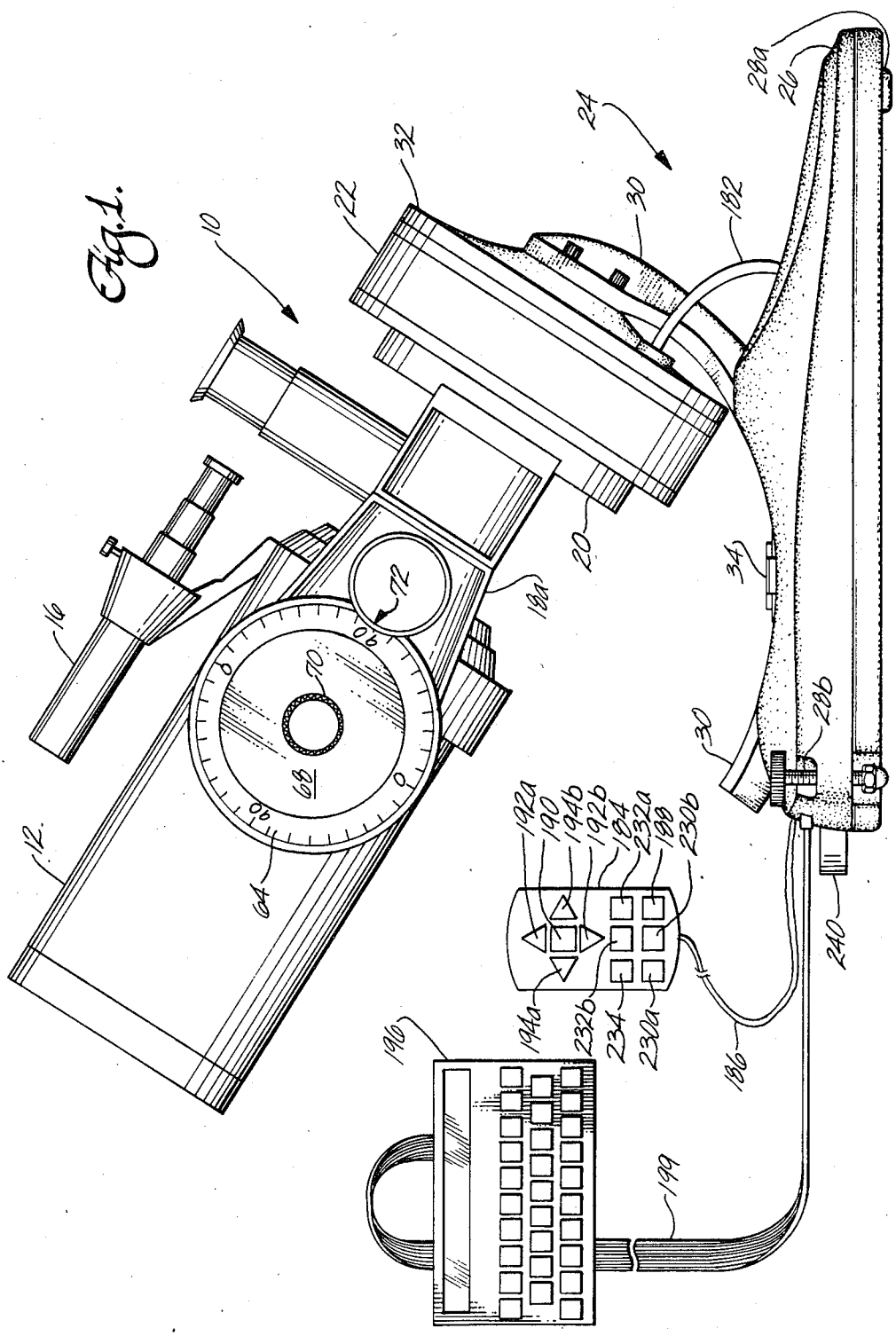

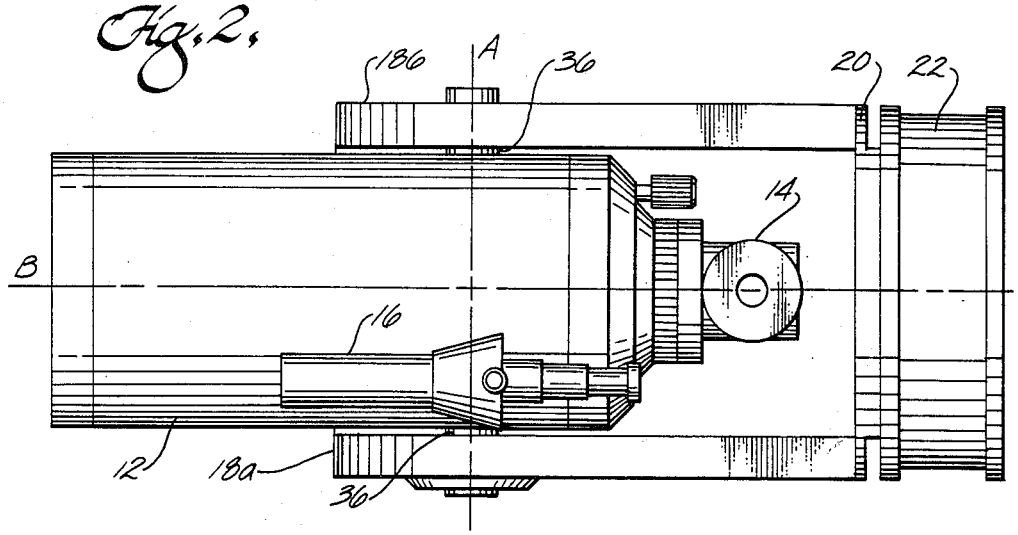
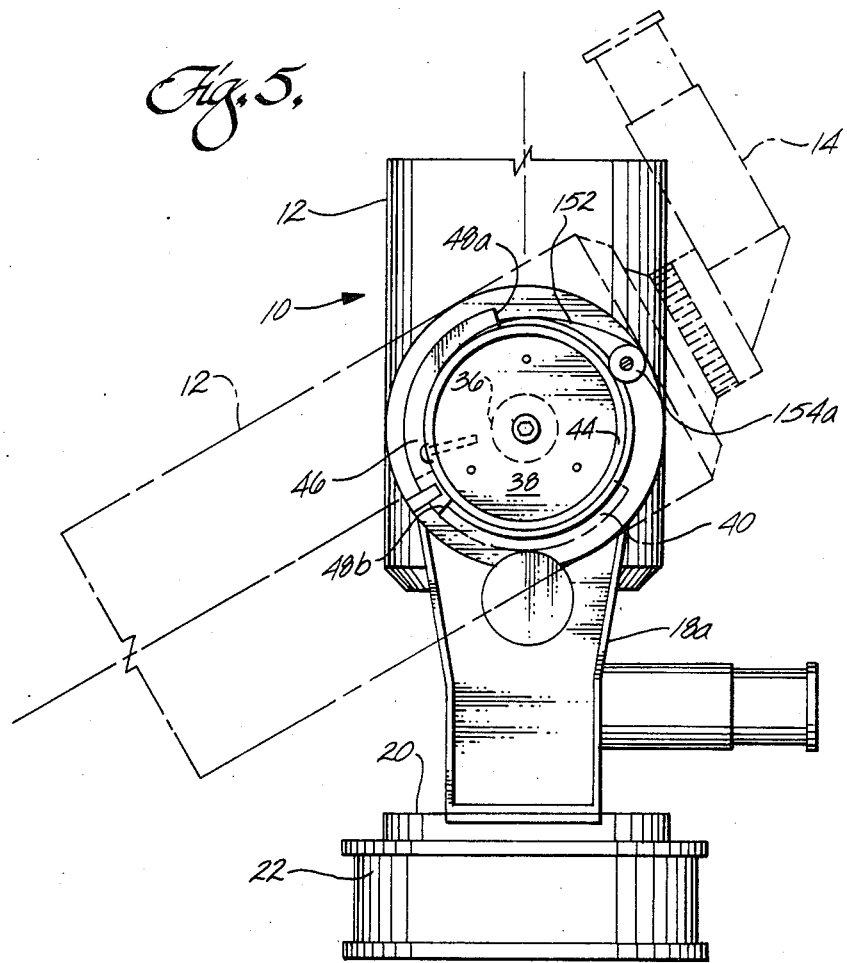

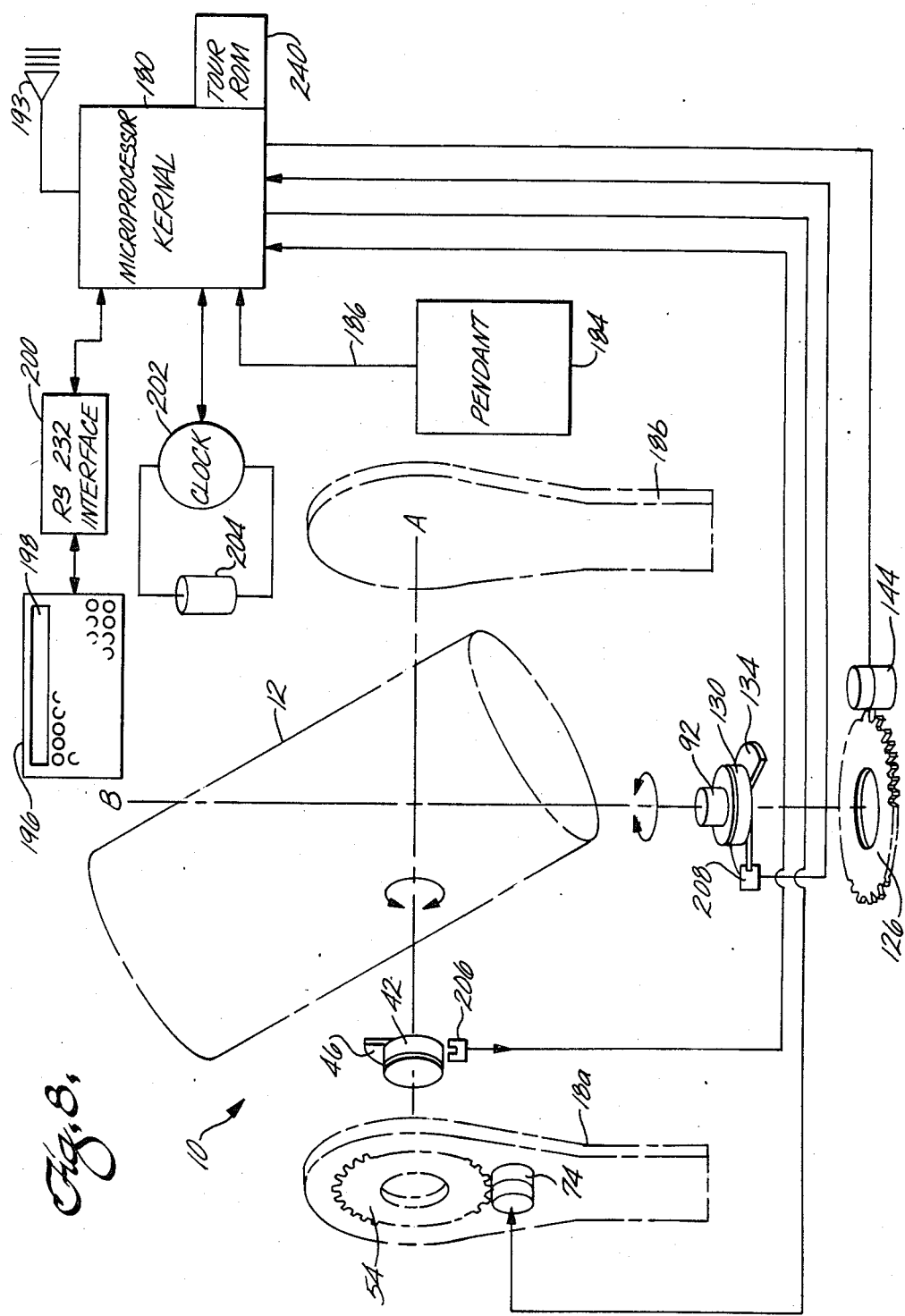

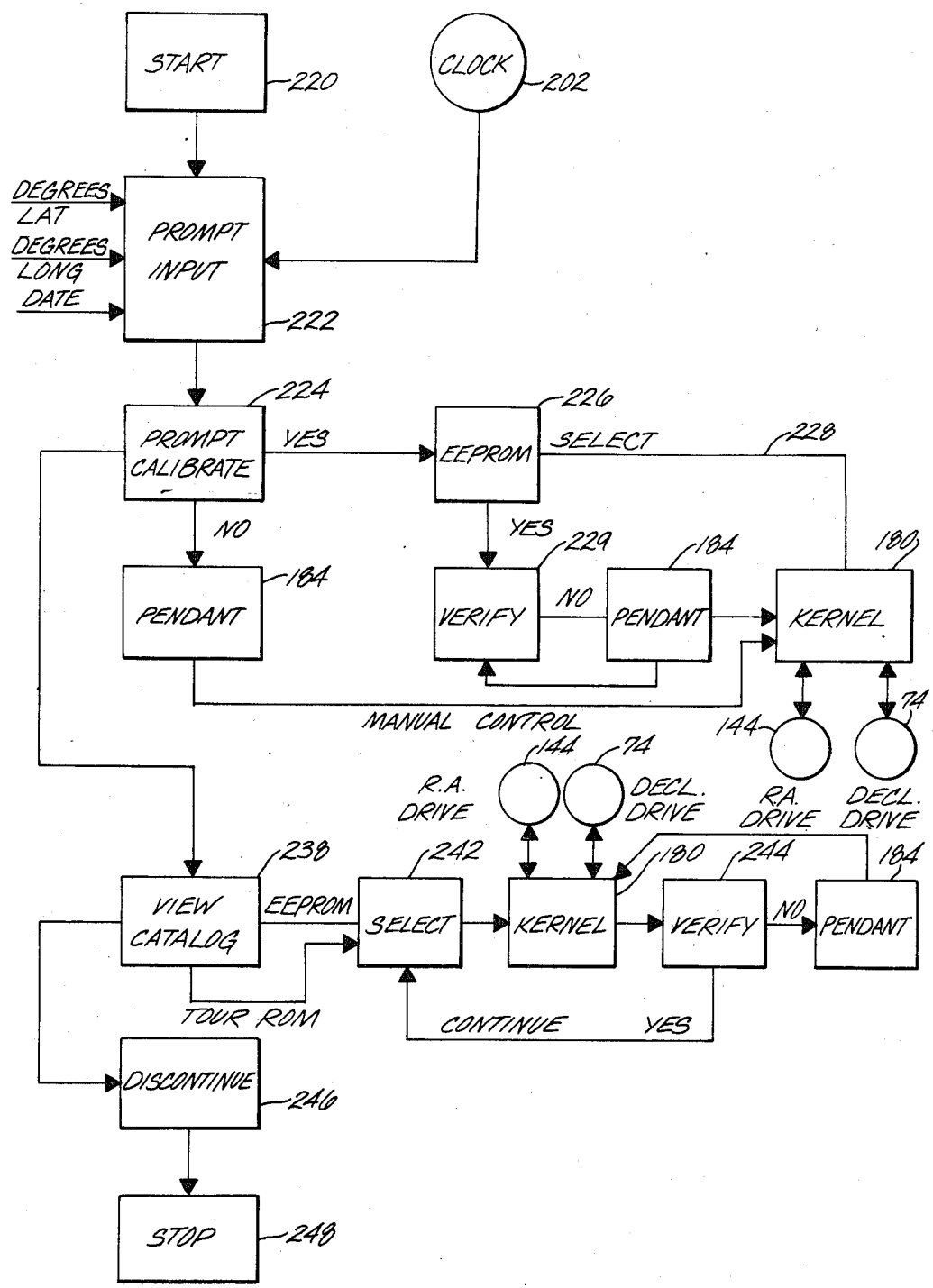

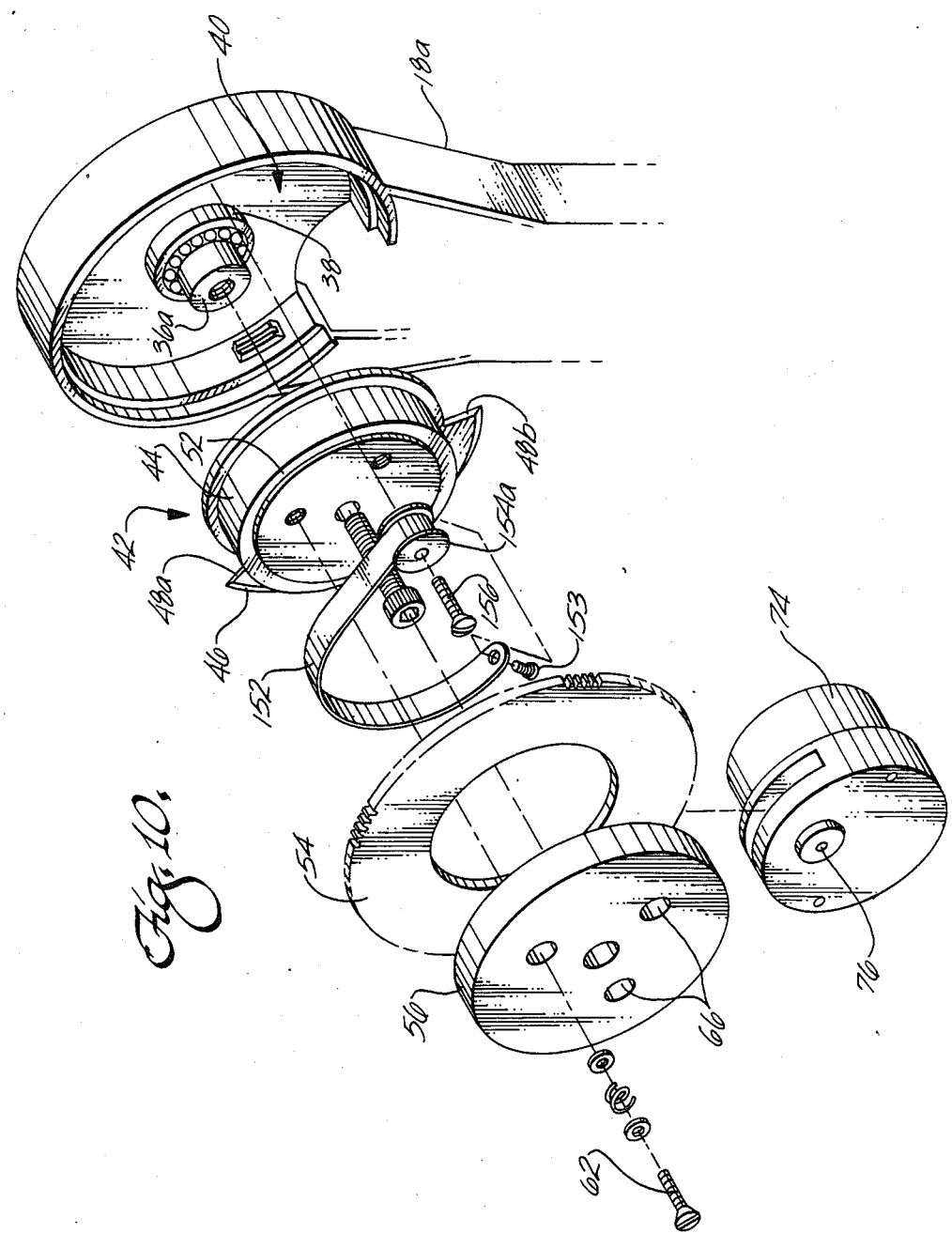

TELESCOPE CONTROL SYSTEM

FIELD OF THE INVENTION

This invention relates to telescopes or other observation instruments. More particularly, it relates to a control system for such telescopes or instruments.

BACKGROUND OF THE INVENTION

It has long been a goal of telescope manufacturers to provide and for astronomers to have a telescope and control system which is easy to use by even the most unexperienced of observers. That is, the telescope should be easy to set up, should enable the observer to easily find the desired celestial object or objects in the sky and should provide a means whereby the desired object may be kept in view for a period of time for obervation thereof. To aid in achieving the desired goals, various telescope mounts have been developed. The most common mount is a tripod arrangement by which the telescope is supported for pivotal motion about a declination axis and an orthogonal right ascension axis. Initially, the telescope is set up such that the right ascension axis is directed toward the North Star (for observers in the Northern Hemisphere) or an imaginary southern polar point (for observers in the Southern Hemisphere).

An imaginary line drawn from the telescope to the North Star or southern polar point is commonly referred to as the polar axis. The description hereinafter set forth, while directed toward observatories in the northern hemisphere applies equally for observatories in the southern hemisphere by simply substituting the southern polar point for the North Star. To so align the right ascension axis with the North Star, i.e., with the polar axis, the typical method is to align the telescope field of view with its right ascension axis, sight the North Star and, while maintaining the sighting of the North Star, adjust the tripod legs until the telescope is adequately supported. As can be appreciated, the sighting of the North Star and maintaining such alignment while the legs are adjusted is a time consuming, frustrating and exerting task.

Once the right ascension axis (polar axis) has been established, the telescope may be pivoted about the right ascension axis and tilted upwardly and downwardly relative to the horizon about the declination axis to find or sight a selected object. Once found, a clock drive pivots the telescope about the right ascension axis at a rate to compensate for earth's rotation thereby keeping the object in view. When viewing planets or the moon, as opposed to stars, certain adjustments must be made to the clock drive to take into account not only the earth's rotation but the relative orbital motions between the earth and the planet or the moon.

To locate a selected object, the observer moves the telescope until the object comes into view. Accordingly, the observer must be knowledgeable to an extent to be able to identify the object from other celestial objects in the sky. To aid observers, star charts and indexes have been tabulated which, when the time, date, latitude and longitude of the telescope are known, give the location of objects in degrees, ascension and declination. Therefore, by referring to such charts or indexes the observer can locate by appropriately moving the telescope and observe the object with only small adjustments necessary.

As can be appreciated, the procedure for setting up the telescope, establishing the polar axis and finding a particular celestial object or objects requires skill, strength, and knowledge of the relative positions of the objects in the sky or an understanding of star charts or indexes. When it is desired to view a set of objects, each object of that set must be identified and sighted either with or without the use of the star chart or index. The foregoing has inhibited amateur astronomers from fully enjoying astronomy.

For large institutional telescopes, i.e., Palomar Observatory, Kitt Peak or the like, the telescopes are large so as to require DC motor drives engaging large gears to pivot in the right ascension and declination axis. Due to the cost to construct and operate such large telescopes, computer controls can be provided to control operation of these motors. For such observatories, the operator need input into the computer control the desired object, (i.e., its coordinates, in degrees right ascension or declination or some other key input data). The computer energizes the motors to properly position of the telescope to view the selected object. Position sensors (i.e. encoders) are provided to give a position feedback signal to the computer and to enable the computer to correctly position the telescope. A clock also provides input into the computer to enable the computer to properly position the telescope, the computer also perhaps providing the clock drive necessary to track the object. Since the latitude and longitude of the observatory is constant, the clock provides the time input and the operator inputs the date, the computer is enabled to find any selected object.

The DC motor drives and computer controls for the large telescopes are too expensive and cumbersome to be suitable for the smaller telescopes used by amateur astronomers. Further, for the smaller telescopes the DC motor type drives with encoder feedback would not provide the accuracy necessary. Accordingly, the desireability of computer control for amateur telescopes was heretofore thought impractical, too expensive, if not unfeasible.

SUMMARY OF THE INVENTION

There is, therefore, provided in the practice of the invention a control system for telescopes. The control system provides for computer control to automatically or under manual control locate and track a selected celestial object or a sequence of objects such as stars, planets or others.

Toward this end, the system includes means for supporting the telescope. The support means includes means for positioning the telescope to view an object and for at least pivotal motion about the right ascension axis to track the object.

Preferably, the support means includes a gimbled-type support so that the telescope can pivot about orthogonal axes one of which defines the right ascension axis, the other defining the declination axis. These supports are affixed to a mount which positions the telescope above the ground for viewing. The mount also provides for the alignment of the right ascension axis with the polar axis. While the tripod type mounts commonly found in the prior art are acceptable, a mount of the type described in copending application Ser. No. 600,765 filed 16 Apr. 1984 and entitled "Telescope Mount," assigned to the assignee of the present invention and the disclosure of which is incorporated by reference, is preferred.

To drive the telescope to pivot about at least one and preferably both of the right ascension and declination axis, drive means are provided. Each drive means is adapted to, in response to an electronic control pulse, pivot the telescope about an axis a selected increment. For this purpose, each drive means includes a stepper-type motor which converts the electrical control pulses into discrete mechanical rotational movements for the telescope about the desired axis. Each stepper-motor is coupled to an appropriate shaft arranged along one of the aforesaid axes for rotation thereof in response to the control signals. By appropriate selection of gear ratios the incremental rotation caused by the stepper-type motor upon receipt of appropriate control pulses can be made sufficiently small so as to closely approximate a continuous drive. To assure an accurate drive, means are provided to eliminate gear backlash.

The drive means according to the present invention provides a simple, economical and accurate drive for the telescope. As an added feature, the stepper-type motors lend themselves well to microprocessor control.

To generate electronic control pulses to operate the drive means, control means are also provided. In a simplified embodiment, the telescope may have a single drive means for pivoting the telescope about the right ascension axis, the control means being adapted to generate control pulses at a predetermined rate so that the telescope pivots to track a selected celestial object. The control means may be adjustable to alter the tracking rate from sidereal rate (star-tracking) to a planetary, solar, lunar rate or the like.

While the rudimentary control means may be viewed as a viable alternative to the traditional electronic clock drive for telescopes, a further and more elaborate embodiment of the invention contemplates that the control means control the movement of the telescope about both the right ascension and declination axes to locate a selected celestial object in the telescope field of view and thereafter to track such object for viewing. Further, these control means may be programmable to locate and track, in sequence, each celestial object of a desired set thereof to enhance the enjoyment of astronomy to even the most uniniated astronomers.

Regarding the control means, it should be understood that such control means must be able to take into account the varying geographical locations at which personal telescopes are used and other control parameters such as day and time of day. Further, the control means should be adapted to observe different objects or certain objects depending upon the astronomer's desires. Over and above the foregoing, the control means must be inexpensive to be accessible to most amateur astronomers.

For this purpose, the control means according to the present invention are adapted to interface and operate in conjunction with a host computer. This host computer is preferably a personal computer such as, for example, a Radio-Shack Model 100 Computer or any other personal computer having a 10–16K memory. It is believed that by utilizing a personal computer of the type already found in a large number of households, the computer control for operation of the telescope becomes available to amateur astronomers.

The host computer provides a means for the operator to enter data, prompt and otherwise operate and communicate with the control means.

The control means also includes further processing means which interface with the host computer and with the telescope control drive means. Preferably, these processing means embodied as a microprocessing kernel containing certain control logic to operate the drive means and to interface with the host computer. If desired, the kernel may contain in a non-volatile memory storing data corresponding to the location of a selected number of stars to enable the control system, when suitably prompted, to locate and track selected ones of those stars. In addition to simply viewing these stars, some or all of such stars may be used as references to finely adjust the control means for subsequent viewing of selected other celestial objects.

To enable an astronomer, through the telescope control according to the present invention, to view selected celestial objects, cartridge tour ROMS (read only memories) may also be provided. For an example, a selected tour ROM may include the data necessary for the control system to locate and track, sequentially, all the stars of a particular constellation or constellations. Each of the tour ROMS is adapted to interface with the kernel to appropriately control the telescope. As can be appreciated, tour ROMS may be developed for viewing any selected constellation, individual stars, planets, comets or the like. In viewing objects other than stars, the tour ROM would provide that information to the kernel for appropriate adjustment of the pulse rate to the drive means operating the telescope to pivot about the right ascension axis to maintain the object in view.

To operate the control system, certain data must be provided including, but not limited to, the time of day and date. To provide this function, a battery-powered clock is provided which keeps sideral time from seconds to tens of years. Via the host computer, the clock can be reset to the correct time.

To provide a convenient way to prompt the control means and to provide for manual override thereof, a control pendant may also be provided. The control pendant which preferably is provided as a small, handheld keyboard, provides the user with local, convenient control for some functions of the telescope control means. The pendant may provide for manual override to pivot the telescope in each direction about a selected axis at slow and fast speeds to adjust the position of the telescope during calibration thereof or during setting up a non-sidereal rate tracking and to control progress during operation of the control means via a tour ROM.

Given the time of day, and latitude and longitude of the telescope, the kernel processes such data along with the relative position data to send pulses to the stepper-motors to pivot the telescope about the right ascension and declination axes to a position wherein a first selected object comes into view. Manual override is provided by the pendant for fine adjustment, the manual override providing pulses to the selected stopper motors and interfacing with the kernel to compensate so that the positions of the remaining objects of the program will be correspondingly adjusted relative to the initial object. During the viewing of the first object, pulses are sent to the stepper-motor to pivot the telescope about the right ascension axis to track the object. By appropriate data in a controlling ROM, the rate of pulses may be altered depending on whether stars, planets, comets or the like are being observed.

When it is desired to proceed on with the remaining objects on the program, the sequence is initiated by an appropriate command entered at the host computer or pendant whereby the computer controlled by the ROMs sends appropriate pulses to these stepper-motors to pivot the telescope and bring the next succeeding object into view. Once in view, tracking takes over to keep the object in view. The sequence is continued until all the objects whose position have been programmed within the ROM have been viewed.

As can be appreciated, the foregoing control system represents a tremendous step forward in amateur astronomy.

By using the inexpensive home computers, already present in many households, and the inexpensive stepper type motor drives, even the most inexperienced observer can use his telescope with the most effect and pleasure. ROMS may be provided to view any selected series of celestial objects and may be updated for special events such as eclipses, comets, or the like.

BRIEF DESCRIPTION OF THE DRAWINGS

These and other features and advantages of the present invention will become appreciated as the same become better understood with reference to the specification claims and drawings wherein:

FIG. 1 is a side view of a telescope and telescope mount adapted for operation by the control means according to the present invention;

FIG. 2 is a side view of the telescope of FIG. 1 shown removed from its mount;

FIG. 5 is a side view of the telescope similar to that of FIG. 3 with portions thereof removed to show components of the drive means;

FIG. 8 is a schematic view of the control for the telescope;

FIG. 9 is a schematic logic diagram illustrating the operation of the control means; and FIG. 10 is an exploded view of the drive means of FIGS. 3 and 4.

DETAILED DESCRIPTION

Figure 3:
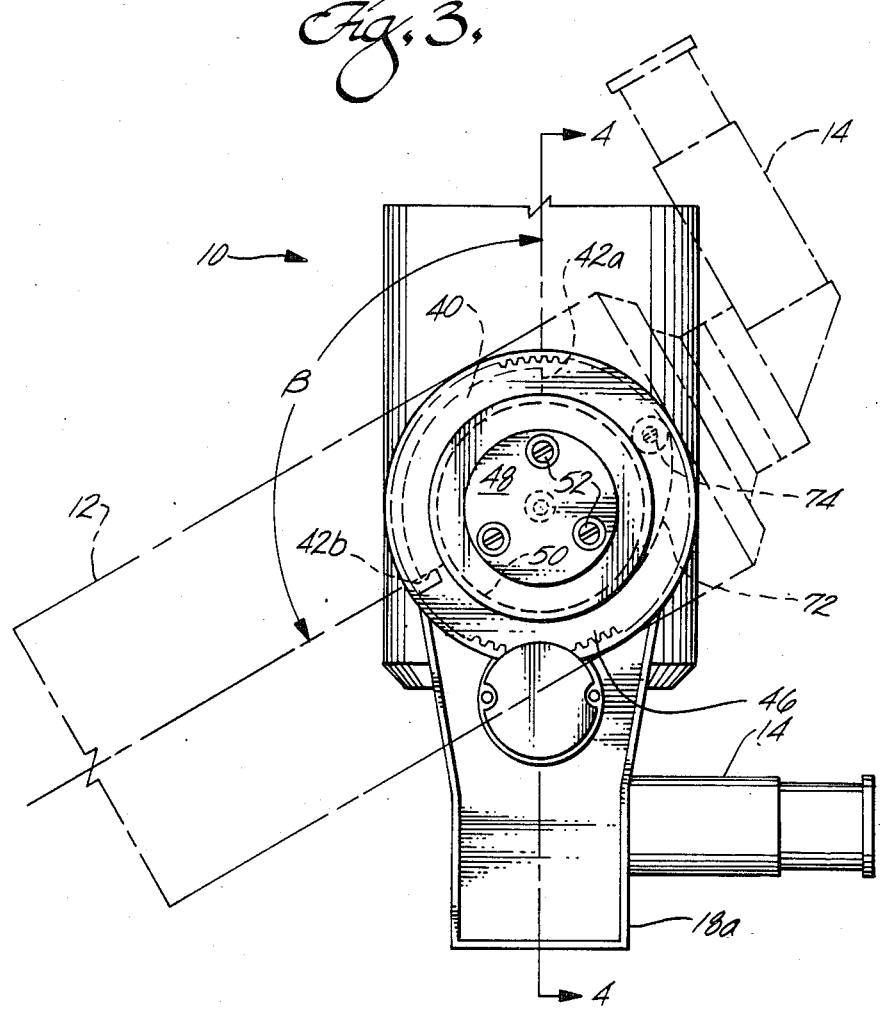
FIG. 3 is a partial side view of the telescope of FIG. 2 shown with portions thereof removed to illustrate components of drive means for pivoting the telescope about the declination axis.

Turning to the drawings, the general aspects of the present invention will now be described.

To observe celestial objects a telescope 10 according to the present invention is provided. While the telescope 10 is shown as being of the Schmitt type, it is to be understood that other types of telescopes such as Newtonian could be controlled according to the teachings of the present invention. The telescope 10 includes a tube 12 which houses some of the optics for the telescope 10 and mounts an eye piece 14. A sighting scope 16 may be mounted to the exterior of the tube 12, the scope 16 having a wide field of view and being adapted to aid in the location of celestial objects.

The tube 12 is mounted between yokes 18a and 18b for pivotal motion about what will hereinafter be referred to as the declination axis or axis A (FIG. 2). As shown in FIG. 1, this pivotal motion of the tube would be upwardly and downwardly. Each of the yokes 18a and 18b is secured to a table 20 which is rotatably supported on a housing 22. The table 20 is coaxially arranged with and is adapted to rotate about what will hereinafter be referred to as the right ascension axis or axis B (FIG. 2). As can be appreciated, the yokes and table define a gimbled support for the telescope tube 12 enabling it to pivot independently about each of the axes A and B.

To arrange the telescope 10 for observing celestial objects, it is expedient, if not necessary, to arrange the telescope 10 such that the right ascension axis (axis B) is arranged colinear with an imaginary polar axis extending from the geographic location of the telescope to the North Star (Polaris.) By so arranging axis B, the telescope may be pivoted about axis B at a rate to compensate for the rotation of the earth thereby keeping the selected celestial object in the field of view. For this purpose, various mounting means such as tripods or the like have been devised. A marked departure from prior art mounting means are those shown in FIG. 1 and described in copending application Ser. No. 600,765, filed 16 Apr. 1984, entitled "Telescope Mount". As shown in FIG. 1, mount 24 includes a substantially flat base 26 having three legs 28a–c, only two of which are shown in the drawing, and which are arranged in a triangular pattern. Leg 28a may be fixed whereas legs 28b and 28c are adjustable for leveling of the base 26 on a bench, table or other type of platform. Base 26, when leveled via the legs 28a–c, provides a level support for mounting an arcuate arm 30 which is movably disposed in a slot (not shown) in the base 26. Suitable clamping means (not shown) are provided for fixing the arm 30 to the base 26 when the desired position of the arm has been achieved. To mount the telescope 10, the arm includes at one end thereof a mounting plate 32 to which the housing 22 and the telescope 10 is adapted to be connected. As shown in FIG. 1, the plate 32 is arranged along a cord for the arcuate arm 30.

To set up the telescope for observation using the mount 24, the observer first determines from a map or the like the latitude of the telescope position. Given this information, the observer moves the arm 30 relative to the base which causes the plate 30 to pivot relative to the base 26 until the telescope's axis B makes an angle with respect to the base equal to, in degrees, to the determined latitude. For this purpose, a scale marked off in degrees latitude may be conveniently provided on the arm 30 and an index on the base 26 so that by aligning the determined degrees latitude of the scale with the index automatically accomplishes the foregoing. Prior or subsequent to the positioning of the arm 30, the observer also orientates the mount 24 such that the arm 30 and more particularly the telescope axis B falls within the plane containing the line of longitude for the telescope. The projection of the polar axis on to the earth defines this line of longitude and accordingly by so arranging the base 26 the right ascension axis or axis B will be disposed colinear with the polar axis. To aid in aligning the arm 30 and axis B with the line of longitude, a compass 34 may be provided with a mount 24 to give an indication of magnetic North. Given the geographic location of the telescope, the deviation between the magnetic North and true north can be determined and the mount 24 adjusted accordingly.

For locations in the Southern Hemisphere a similar procedure is followed using instead of Polaris an imaginary Southern polar point.

It is of course to be understood that other suitable means may be used by which to align axis B (the right ascension axis) with the North Star or the Southern polar point. A traditional means includes aligning the telescope so that the field of view is aligned along axis B and thereafter sighting the North Star and fixing the mounting means.

Once the polar axis has been established, i.e., axis B has been arranged to be colinear with polar axis, the telescope may be pivoted about its axis A to locate any desired celestial object B. Once located, by revolving the telescope about axis B to compensate for the earth rotation, the selected celestial object is kept in view. For stars, the rate of rotation about axis B is well known as is referred to as the sidereal rate. For objects such as planets, comets or the like, which are relatively close to the earth, not only must the rotation of the earth be taken into account but also must the relative movements between the earth and the object. The rate of rotation about axis B to maintain such objects in view varies and is referred to as a non-sidereal rate or, specifically for planets, a planetary rate.

Given the foregoing description of the general aspects of the telescope and its mounting means, the mechanical aspects of the present invention will now be described.

MECHANICAL

Figure 4:
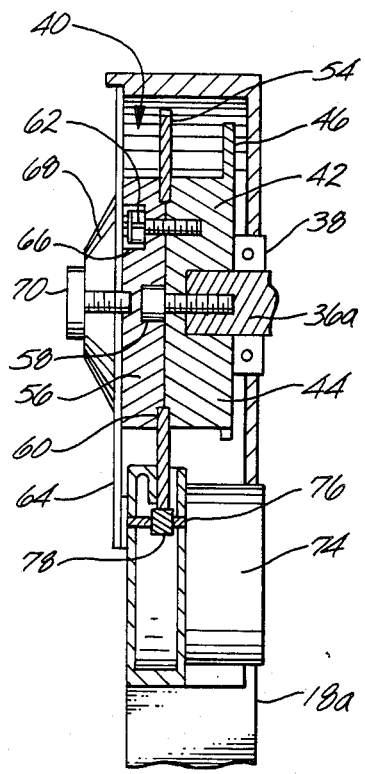
FIG. 4 is a partial section view taken along line 4—4 of FIG. 3 illustrating the drive means.

Turning to FIGS. 2-5 and 10, drive means for pivoting the telescope about axis A are shown. To mount the telescope tube 12 between the yokes 18a and 18b, stub shaft 36a and 36b are secured to the tube 12 each stub shaft being journalled to a corresponding yoke 18a or 18b. The stub shaft 36a and 36b are coaxially arranged along and are journalled to the yokes 18a and 18b to define axis A. While stub shaft 36b is simply journalled to the yoke via suitable bearing means, stub shaft 36a as shown in FIG. 4 is coupled to the drive means according to the present invention.

As shown in FIGS. 4 and 10, stub shaft 36a is journalled to yoke 18a by a bearing set 38 which may be ball bearings or the like. Yoke 18a is provided with a recess 40 which receives stub shaft 36a. Secured to the stub shaft 36a for rotation therewith is an occulting disk 42 having a cylindrical body 44 and a radially outwardly projecting fin 46. For purposes which will hereinafter become evident, fin is opaque extending only partially about the body 44. Preferably, the fin 46, as shown in FIG. 5, defines an arc of about 120° and has radially directed edges 48a and 48b defining the termini for the fin 46. The occulting disc 42 may be secured to the stub shaft 36a by a threaded bolt 50 coaxially received by the stub shaft 36a and frictionally holding the occulting disc 42 to the stub shaft 36 for rotation therewith.

Axially opposite the fin 46 the occulting disc 42 has a circumferential shoulder 52 which is adapted to mount a ring-shaped gear 54. By way of example, gear 54 may have a diameter of about 4 inches, 192 teeth having a pitch of 48.

To retain the gear 54 against the shoulder 52 of the occulting disc for mutual rotation, a mounting disk 56 is provided. The mounting disc 56 includes an axial recess 58 to accommodate the bolt 50 and a groove 60 to closely mate with the gear 54 and trap it against the shoulder 52. Screws 62 with washers and lock washers or the like may be used to couple the mounting disc 56 to the occulting disc 42 and frictionally trap the gear 54 therebetween. In this fashion, the gear 54 and occulting disc 42 are securely coupled to the stub shaft 36a for rotation therewith. Of course, it is to be understood that other means may be used for so coupling a gear and an occulting disc to the stub shaft 36a for rotation therewith.

To give an indication of the degrees of declination for the telescope an index ring 64 is secured to the mounting disc 56. To accommodate the index ring 64, the mounting disc 56 has counterbores 66 which receive each of the screws 62 providing thereby a flat face on the mounting disc 56 to mate with the index ring 64. A locking cone 68 forcibly traps the index ring 64 against the mounting disc 56 by virtue of a hand screw 70 which passes through the locking cone 68 and index ring 64 and is threaded into the mounting disc 56. By tightening the hand screw 70 the index ring 64 can be secured to the mounting disc 56 and thereby to the stub shaft 36a. By providing a suitable index point 72 (FIG. 1) the degrees of declination for the telescope 10 can be read from the index ring 64.

The drive means for pivoting the telescope about axis A includes a stepped-type drive means preferably embodied as a stepper motor 74. The stepper motor 74 has a drive shaft 76 journalled to the motor housing. The drive shaft 76 mounts a pinion 78 which meshes with the gear 54 as shown in FIG. 4 with a 12:1 gear ratio. The stepper motor 74 with a 25:1 integral gear reduction is of the type available from Airpax Corporation of Cheshire, Conn. The stepper motor 74 is adapted to convert an electrical control pulse or string of pulses (hereinafter referred to as a control pulse) into discrete mechanical rotational movements of the shaft 76 and of its pinion 78. In response to receiving a control pulse, the stepper motor 74 rotates its shaft 76 through 0.0094° of revolution. By virtue of the 12:1 gear ratio between the pinion and the gear having, for example, 192 teeth the gear 54 and stub shaft 38a are caused to rotate 0.00078°. Further, depending upon the sequence of the pulses, the pivoting motion of the telescope about axis A is either upwardly (+) or downwardly (−).

The manner by which the electronic control signals are generated and provided to the stepper motor 74 is set forth under the heading Control System below. Suffice it to say that by providing the correct number and sequence of pulses the stepper motor 74 can be activated to pivot the telescope about the declination axis A either clockwise or counterclockwise the desired amount.

Figure 6:
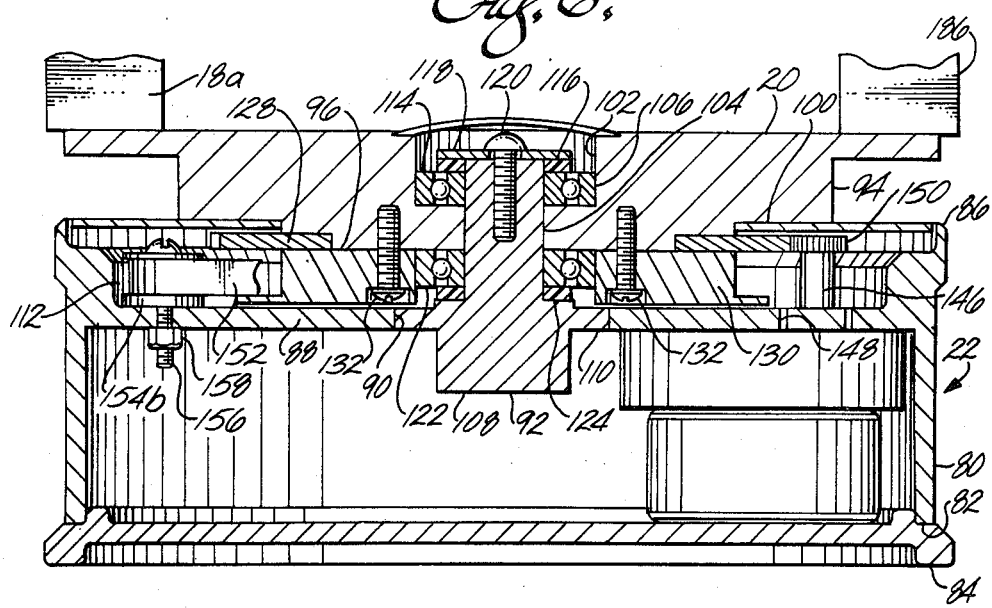
FIG. 6 is an enlarged partial section view of the base for the telescope illustrating the drive means for pivoting the telescope about the right ascension axis.
Figure 7:
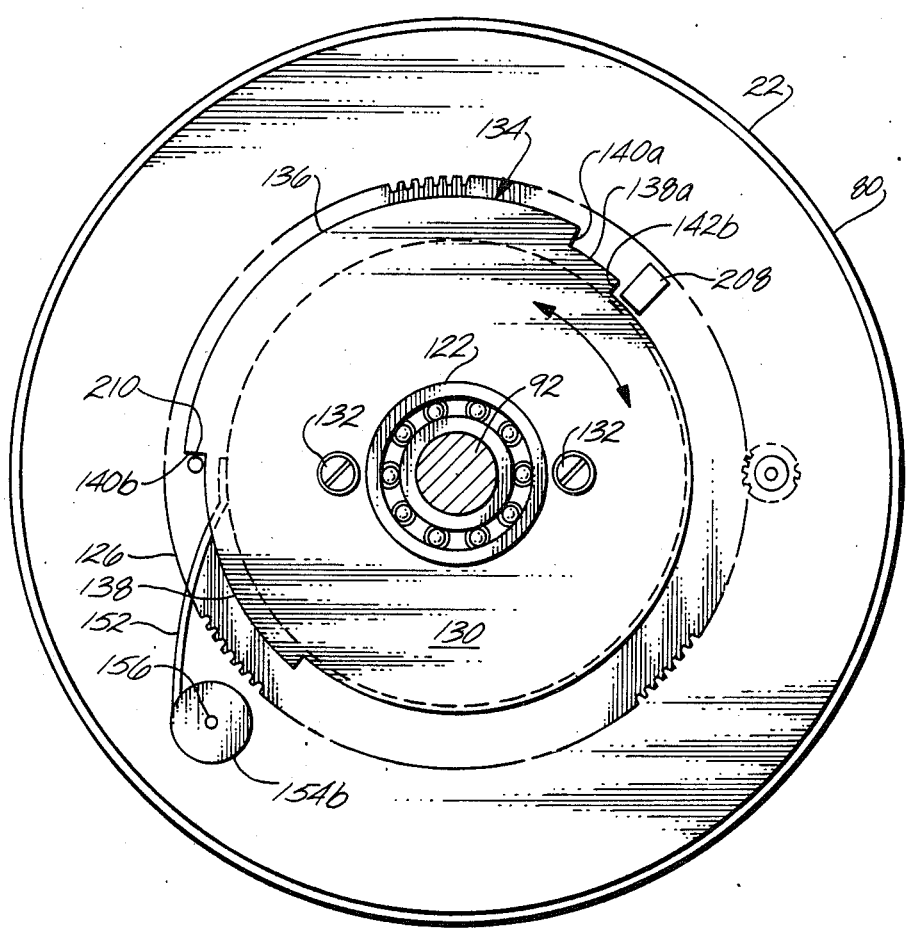
FIG. 7 is a bottom view of the telescope base further illustrating the drive means.

The means for pivoting the telescope about the right ascension axis B are somewhat similar to that described above with reference to the pivotal motion of the telescope about declination axis A. With reference to FIGS. 6 and 7, it can be seen that the housing 22 includes a cylindrical portion defining a barrel 80 having a bottom edge 82 to receive and mount a bottom cap 84 and, opposite the bottom edge 82, an axially directed lip 86. Positioned between the lip 86 and bottom edge 82 the barrel 80 includes a radially projecting intermediate wall 88. Wall 88 has an axial bore 90 in which is affixed a shaft 92. Shaft 92 is arranged coaxially with axis B for the telescope 10.

As shown in FIG. 6, the table 20 has an underside including a cylindrical portion 94 and a smaller diameter, cylindrical boss 96. An annular seat 100 is defined between the portion 94 and boss 96. Table 20 includes a countersunk bore 102 and a coaxially arranged shaft bore 104. The annular surface at the bottom of bore 102 defines, in cooperation with the wall of the bore 102, a bearing seat 106. Shaft bore 104 is adapted to closely pass the shaft 92.

Shaft 92 includes at one end a head 108 having a radially outwardly projecting rim 110. The rim 110 is adapted to be secured by suitable means into bore 90 thereby securing the shaft 92 against rotation relative to the housing 22. The space between the wall 88 and boss 96 for the table 20 defines a chamber 112 which houses certain components of the drive means.

To provide for the pivotal rotation of the table 20 journalling means are provided. As shown in FIG. 6, these jounalling means include a first bearing set 114 which is disposed in bearings seat 106 to rotatably couple the table 20 to the shaft 92. To axially hold the first bearing set 114, a washer 116 is held in place against the first bearing set 114 by a retainer 118 which is, in turn, held in place by a screw 120 threaded axially into the shaft 92. Acting in cooperation with the first bearing set 114, the journalling means further includes a second bearing set 122 disposed in the chamber 112 about the shaft 92. The second bearing set 122 is held in place by the boss 96 at one side thereof and by a washer 124 at the other side thereof, the washer 124 residing against the shaft head 108. The washer 124 and second bearing set 122 are axially sized to prevent the drive means as hereinafter described from engaging the wall 88 which would prevent the free pivoting motion of the table 20. Washers 116 and 124 may be constructed from a plastic or the like.

To pivot the table 20 as described below, the drive means includes a gear 126 which is frictionally trapped within a circumferential groove 128 in the boss 96. To so trap the gear 126 and for other purposes, the drive means further includes an occulting disc 130 disposed in the chamber 112 and held against the boss 96 for the table 20 by screws 132.

The screws are received by threaded bores in the table 20. Like the occulting disc 42 for the drive means for pivoting the telescope about the declination axis A, occulting disc 130 includes, as best shown in FIG. 7, a radially outwardly projecting fin 134 including a major portion 136 which spans and arc of about 180°–220° around the occulting disc and includes oppositely disposed minor portions 138a and 138b. Minor portions 138a and 138b extend about the occulting disc at either side of the major portion 136 and do not project radially to the extent of the major portion 136. Accordingly, at the juncture between the major portion 136 and each of the minor portions 138a and 138b, radial edges defining stops 140a and 140b are created at the periphery of the occulting disc 130. Further, each minor portion 138a and 138b remote from the major portion 136 terminates at a radial edge 142a and 142b, respectively. The span of the fin 134 defined by the major and minor portions between the edges 142a and 142b may be for example 225°.

The drive means includes a stepped-type drive means which is preferably embodied as a stepper motor 144. The stepper motor 144 is similar to stepper motor 74 in that upon receipt of an electronic control pulse the stepper motor 144 is energized to provide an increment of work. Stepper motor 144 is disposed between wall 88 and bottom cap 84, and has a shaft 146 which projects through an opening 148 in the wall 88. Disposed on the shaft 146 is a pinion 150 which meshes with the gear 126. The pinion 150 and gear 126 are sized to have a 12:1 gear ratio much the same as the gear 54 and pinion 78 for the drive means for pivoting the telescope about the declination axis A.

In response to the receiving of an electronic control pulse the stepper motor 144 incrementally rotates the shaft 146 and pinion 150 to incrementally drive the gear 126 and pivot the table and telescope about the right ascension axis B.

Referring to both the drive means for pivoting the telescope about the declination axis A and the right ascension axis B, to provide for the precise control drive necessary for smooth operation of the telescope, means are required to prevent backlash between the gears and pinions. As is known, backlash can be defined as play between the gear teeth of intermeshing components such as the gears and their pinions. Should backlash be evident in the control drive means for the telescope, the positioning of the telescope would not be accurate in that backlash would allow the telescope, about each of the axis A and B, to move in an indeterminate amount. Accordingly, to eliminate backlash, each of the drive means for the telescope includes means for imposing a bias upon the gear to maintain the gear's teeth in engagement with the teeth of the pinion and thereby eliminate backlash. Preferably, referring to FIGS. 5, 6, 7 and 10 these biasing means are embodied as a negator spring 152 which is coupled between the occulting disc and a suitable support. Referring to FIGS. 5 and 10, illustrating the drive means for pivoting the telescope about the declination axis A, the negator spring 152 has one end secured to the occulting disc body 44 by screw 153, the negator spring 152 being coiled around a spool 154 which is secured to yoke 18a by screw 156. The negator spring 152 is connected to the spool 154 and is coiled thereabout and the spool 154 is freely rotatable about the screw 156. The negator spring 152 is adapted to impose a substantially constant clockwise bias upon the occulting disc and gear 54. As the gear 54 is rotated via the pinion, the negator spring 152 coils about or uncoils from the spool 154 maintaining the bias upon the gear holding the gear teeth in mesh with those of the pinion 78. In this fashion, backlash is prevented. With reference to FIGS. 6 and 7 and the drive means for pivoting the telescope about axis B, the negator spring 152 has one end connected to the occulting disc 130 the other end being connected to and coiled about a spool 154b. Spool 154b is secured by a screw 156 to wall 88, a bolt 158 holding the screw 156 and spool 154b in position. The spool 154b is freely rotatable about the screw 156. In a manner similar to that described above, the negator spring 152 maintains a constant bias upon the occulting disc 130 and gear 126 to maintain the gear teeth in mesh with the teeth of the pinion 150. As the table 20 and telescope are pivoted about the right ascension axis B, the negator spring 152 maintains a substantially constant bias upon the gear 126 to eliminate backlash.

With the foregoing mechanical aspects of the present invention set forth, the control system and operation of the telescope 10 will be described.

Control System

By providing the drive means described above for the telescope, the operation of the telescope 10 is susceptible to electronic control. It is important to note that due to the stepped nature of the drive means, each control pulse incrementally pivots the telescope about each of the selected axis a known, incremental amount. The elimination of backlash for the drive means enhances the accuracy of each incremental pivot initiated by control pulse received by the drive means. Accordingly, as can be appreciated, by controlling a number of control pulses to each drive means the telescope position can be controlled.

A characteristic of the drive means, and more particularly each stepper motor thereof, provides for both forward and reverse rotation of the motor shaft dependent upon the sequence in which the motor coils are energized by the control pulse. That is, by selecting a forward or reverse sequence and by controlling a number of pulses the telescope can be pivoted as desired both clockwise and counterclockwise about each of the axes. Along with controlling the number and sequence, the number of pulses per unit time can also be controlled to provide the desired rate of pivot for the telescope. The foregoing features are at least partially achieved by the drive means and the stepper motor described above.

To control the sequence, number of pulses, and pulse rate, a microprocessor kernel 180 is provided and is schematically shown in FIG. 8. The electrical diagram for kernel 180 is shown in FIG. 11. The microprocessor kernel 180 is preferably embodied as a ROM-less, single-chip processor which includes a central processing unit or CPU, random access memory (RAM), timers, universal asynchronous receiver transmitter (UART), input-output (I/O) ports and oscillator among other components. From an external power source, such as a battery or electrical outlet (not shown) power is supplied to the kernel 180. For a mount 24 as shown in FIG. 1, the kernel 180 may be conveniently disposed in the base 26.

The microprocessor kernel 180 communicates with each of the drive means for the telescope including stepper motors 74 and 144 as depicted in FIG. 8. As shown in FIG. 1, this communication may be through a cable 182 extending from the kernel 180 and base 26 through the plate 32 and into the housing 22. A further cable (not shown) extends from the housing 22 to the yoke 18a and the drive means housed therein.

The kernel 180 is adapted to receive various inputs, to process the inputs, and to send the desired number of pulses in the proper sequence and at the proper rate to one or both of the drive means and more particularly the stepper motors. As described below, these various inputs and other commands may be under direct operator control or may be automatically controlled.

To provide for direct operator control over the kernel 180 and the operation of the telescope a pendant 184 as shown in FIGS. 1 and 8 is provided, the pendant 184 communicating with the kernel 180 by suitable cable 186. The pendant 184 is adapted to be hand held and is powered through the cable 186 from the kernel 180 and the outside power source. Controls are provided in the pendant 184 which are activated by depressing one or more buttons located thereon. Of course, it is to be understood that direct operator control may be embodied as any suitable means including a keyboard disposed on the base 26 or other means.

The pendant 184 provides for direct operator control over the functions of the telescope. For example, the pendant 184 may be provided with a track button 188 which if depressed signals the kernel 180 to generate and send control pulses to the stepper motor 144 at a rate as controlled by the timers within the kernel 180 so as to pivot the table 20 and telescope about the right ascension axis at a sidereal rate thereby tracking and keeping a celestial object such as a star in view. In that the degrees of pivot per control pulse is known the kernel 180 can be provided with the electronic components for generating and sending control pulses to pivot the telescope in the desired manner. In that the incremental pivot per control pulse is small, the pivotal motion closely approximates a continuous pivot thereby allowing viewing or photographing of the celestial object without significant aberration. As can be appreciated in a simple embodiment of the present invention the kernel 180 may be, for example, disposed in the telescope housing 22 and energized to provide the tracking motion of the telescope thereby doing away with the electric clock drives heretofore used in the prior art.

From time to time it may be necessary to adjust the position of the telescope to, for example, view another object in the sky. While this adjustment may be accomplished by manually turning the telescope about each of the selected axis as desired which would be opposed only by the small torque of the stepper motors and perhaps the bias of the negator springs, the pendant 184 may be conveniently provided with operator controls for positioning the telescope under control of the kernel 180. For example, the pendant may be provided with a button 190 which when depressed cancels the tracking command which may have previously been sent by depressing button 188. Accordingly, the telescope will stop its pivotal motion about the right ascension axis B. To reinitiate the tracking command button 188 need only be depressed. In lieu of depressing button 188 the pendant 184, referring to FIG. 1, may be provided with adjacent pairs of buttons 230a and 230b the depressing of button 230a initiating the automatic tracking of the object and the depressing of button 230b discontinuing the tracking. Whether or not the telescope is currently operating under the tracking command, the position of the telescope about the declination axis A may be altered by depressing one of two buttons 192a and 192b provided on the pendant. Depressing and releasing button 192a sends a command to the kernel 180 to adjust the position of the telescope by generating and issuing a control pulse to stepper motor 74 in the proper sequence to pivot the telescope upwardly one increment. A tone generator 193 or beeper may be energized to give an audible tone when each button is depressed. By depressing and holding down button 192a the kernel 180 is commanded to generate and send control pulses at a first rate and in the proper sequence to cause the telescope to pivot upwardly about the declination axis A in a substantially continuous manner until button 192a is released. In this fashion, the pivoting of the telescope in an upward fashion about declination axis A can be controlled. To control the downward pivoting of the telescope button 192b can be depressed and released causing the kernel 180 to generate a control pulse at the proper sequence and a tone to pivot the telescope downwardly one increment. Again, by holding down button 192b the kernel 180 is commanded to generate control pulses at the same first rate and in the proper sequence to cause the telescope to pivot downwardly about the declination axis A at a substantially continuous rate until button 192b is released. Index ring 64 enables the operator to easily determine the degrees of declination for the telescope.

Should the same pivoting motion of the telescope about the declination axis A be desired, but at a faster rate, button 190 may be depressed simultaneously with either of the buttons 192a or 192b which issues a command to the kernel 180 to generate control pulses in the proper sequence but at a faster rate causing the telescope to pivot to the desired position until the buttons are released. As can be appreciated, as the operator approaches the desired position of the telescope as determined from the index ring 64, button 190 can be released causing the kernel 180 to generate the control pulses at the first, slower rate allowing the operator to zero in upon selected position.

To pivot the telescope about the right ascension axis B under operator control the pendant is provided with buttons 194a and 194b which may be disposed at either side of button 190 for convenience. Button 194a when depressed commands the kernel 180 to generate control pulses, in the proper sequence and at a first rate, and issue those control pulses to the stepper motor 144 to cause the table 20 and telescope to pivot in a first direction about the right ascension axis B. By depressing and quickly releasing button 194a an incremental pivot may be obtaining. By holding down button 194a a substantially continuous pivot of the telescope may be obtained. Again, with reference to button 190, if it is depressed simultaneously with button 194a, the pivot of the telescope in a first direction about the right ascension axis B may be obtained at a faster rate. An scale (not shown) may be provided on the table 20 and an index at the housing 22 to enable the operator to quickly read the degrees of right ascension and obtain the desired position. Should a reverse pivot of the telescope about the right ascension axis B be desired, button 194b can be depressed in the manner similar to that described above. Of course, button 194b may be depressed simultaneously with button 190 to obtain a pivot at a desired faster rate.

As can be determined from the foregoing, the kernel 180 under the control of the pendant 194 can be commanded to position the telescope as desired and to initiate a tracking mode by which the telescope will track, in sidereal time, a selected celestial object. Further, the pendant provides manual override to control the position of the telescope in either degrees, declination or right ascension, as desired. In conjunction with tracking, for example, when a planet if being tracked, one of the buttons 194a or 194b may occasionally have to be depressed to maintain tracking since the planet will move at a non-sidereal rate.

While the above described embodiment of the present invention providing for tracking and, if desired, manual override via the pendant 184, it is believed that one of the appealing features of the telescope control system according to the present invention is that it is susceptible to automatic control. That is, under suitable commands, the kernel 180 may be controlled to generate control pulses to locate a desired object, to track that object and then, under a proper prompting sequence move so as to locate another celestial object and track, if desired. These features enable an amateur astronomer unfamiliar with astronomy to obtain full use of their telescope.

Under automatic control, it can be appreciated that the kernel 180 must be provided with various inputs required for the system to determine the location of any selected celestial object and to track that object. Further, the kernel 180 should be capable of communicating with the operator such as requesting certain prompts, or to display information which may be the position of the telescope in degrees declination right ascension and/or list which object (i.e., star or planet) should currently be in view. In conjunction with the foregoing, the operator must be provided with a means for communicating information to the kernel 180 to control its operation.

Accordingly, the control system according to the present invention is adapted to cooperate with a personal-type computer commonly found in many households shown as PC 196. An example of such a PC is Radio-Shack Model 100 Computer. PC 196 includes hardware such as a keyboard and the software to enable the operator to communicate with the kernel 180. A display 198 is also provided to enable the operator to verify inputs and to enable the kernel 180 to communicate with the operator. While the Radio-Shack Model 100 computer is shown by way of example, it is to be understood that any suitable personal computer having a 10 to 16 K-memory may be used.

For the Radio-Shack Model 100 computer the following represents a software program permitting the PC 196 to communicate with the kernel 180.

ITEM 1A
---

```
                                             .MAXFILES=2:DEFSNGA-H,K-Z:CLEAR250:KR=57.29577
10 DIM G5$(3,15),H!(3,6),I$(15)
11 OPEN"COM:68N2D"FORINPUTAS1:OPEN"COM:68N2D"FOROUTPUTAS2
15 GOTO 1000
20 GOTO 4080
30 REM COMM ROUTINE
50 B$="":L$="":PRINT#2,A$+"@"
70 B$=INPUT$(1,1):IFB$="&"THENC$="T3":GOTO120
80 IF B$="\" THEN 180
90 IF B$="@" THEN 120
95 L$=L$+B$:GOTO 70
120 IFLEFT$(C$,1)="T"THEN140
130 REM
132 RETURN
140 REM
142 PRINTL$;:L$="":GOSUB5030
165 IFC$="T1"THENC$="":GOTO 132
170 C$="":IFR$="Y"ORR$="v"THEN130ELSE1265
180 GOSUB130:IFLEFT$(A$,2)="20"THENCLS:A$="@5":C$="T1":GOSUB30:RETURN
183 IF A$="J" THEN 185 ELSE CLS
185 A$="@5":C$="T2":GOSUB30:RETURN
```

```
1000 CLS:PRINT @ 1,STRING$(38,"*"):PRINT @41,"*";TAB(5);"BAUSCH & LOMB CRITERIO
N 4000";:PRINT@78,"*":PRINT @81,"*":PRINT @118,"*":PRINT @121,"*";TAB(5);"TELESC
OPE AUTOMATOR PROGRAM":GOSUB1400
1001 CLS:PRINT"DON'T WORRY,I AM GETTING ORIENTED.";:A$="]":H=1:GOSUB30.IF
C$="73"THEN10ELSEH=0:A$="01":GOSUB30:C1=VAL(L$)
1005 CLS:A$="02":GOSUB30:IFA$="05" THEN 1005 ELSEPRINT@40,LEFT$(L$,20):PRINT@16
0,RIGHT$(L$,17);:GOSUB5030:IFR$="Y"ORR$="v"THEN1040ELSE1110
1040 PRINT@80,SPACE$(40):PRINT@160,"ENTER AS INDICATED ABOVE ":PRINT@120,"MON D
Y YEAR HH MM SS":PRINT@80,"";:LINEINPUTA$:A$="04"+A$:GOSUB30:FLG=2:GOTO1005
1110 A$="13":GOSUB30:L=VAL(L$)/C1:CLS:PRINT:PRINT"STORED LONGITUDE":PRINT "IN D
ECIMAL DEGREES = ";CSNG(L*KR):PRINT"CHANGE Y/N -- ";:GOSUB5030:IFR$="Y"ORR$="v"T
HEN1140ELSE1160
1140 PRINT:INPUT"NEW LONGITUDE";LL:PS=1:L=(LL/KR):A$="14"+STR$(L*C1)+"/":GOSUB3
0
1160 A$="15":GOSUB30:LA=VAL(L$)/C1:CLS:PRINT:PRINT"STORED LATITUDE IN":PRINT"IN
 DECIMAL DEGREES =";CSNG(LA*KR):PRINT"CHANGE Y/N -- ";:GOSUB5030:IFR$="Y"ORR$="v
"THEN1190ELSE1230
1190 PRINT:INPUT"NEW LATITUDE";L1:PS=1:LA=(L1/KR):A$="16"+STR$(LA*C1)+"/":GOSUB
30
1230 IF PS=1 THENX9=6:GOSUB3000
1250 CLS:PRINT:PRINT "DO YOU WISH TO INPUT COORDINATES FROM   KEYBOARD . . .Y/N
";:GOSUB5030:PPINTR$;:IF R$="Y" OR R$="v"THEN GOSUB 5000:GOTO 1265
1260 GOSUB 4000:GOTO 1265
1265 CLS:IFH=1 THEN 1300ELSEPRINT:PRINT "ENTER 1=CONTINUE OBSERVING":PRINT"
 2=REINITIALIZE":PRINT"       3=PERFORM GUIDE STAR ROUTINE ":PRINT"     4=END
":PRINT"    ";:INPUT X1$:IF X1$="1" THEN GOTO 1250
1266 IF X1$="2" THEN GOTO 1
1267 IF X1$="3" THENX9=6:CNT=0:GOSUB 3000:GOTO 1265
1268 IF X1$="J4"THENCLOSE:END
1300 CLS:PRINT:PRINT "YOU MAY <1> REINITIALIZE":PRINT"         (2) END ":LINEINP
UT"        ";CH$:IFCH$="1" THEN1ELSE END
1400 PRINT@158,"*":PRINT @ 161,"*":PRINT@161,"*";TAB(8);"COPYRIGHT (C) 1984 BY"
:PRINT@198,"*":PRINT@201,"*";TAB(8);"BY BAUSCH & LOMB, INC.":PRINT@238,"*":PRINT
@241,"*";TAB(12);"VERSION 7/84":PRINT@278,"*":PRINT@281,STRING$(38,"*")))
1405 FORI=1TO200:NEXT:CLS
1410 RETURN
2000 GOSUB9040:GOSUB6000:DT=(1900+Y1+.083*M-E0)*7.2722*10^-5
2020 IF RF>6.2831853 THENRF=RF-6.2831853:GOTO 2020
2030 IF DF>6.2831853 THEN DF=DF-6.2831853:GOTO 2030
2060 T2=(((Y1+1900+E0)/2)-1900)/100:MK=3.07234+(.00186*T2)::NK=1.33617:RA=RF+(M
K+ NK*SIN(RF)*TAN(DF))*DT:DC=DF+NK*COS(RF)*DT:SA=SIN(DC)*SIN(LA)+COS(DC)*COS(ST-
RA)*COS(LA):CA=SQR(1-SA*SA):LT=ATN(SA/CA)
2140 IFLT>.08GOTO2160ELSEHA=0:DC=0:GOSUB8900:BEEP:BEEP:PRINT@40,"      STAR BELOW
 HORIZON. PRESS <ENTER> ";:PRINT @80,STRING$(40,"*"):PRINT @78,"   ";:GOSUB 5020:K$
="0":GOTO 2280
2160 RR=2.8216E-4*CA/SA:RA=RA+RR*COS(LA)*SIN(ST-RA)/(COS(DC)*COS(LT)):DC=DC+RR*
(SIN(LA)-SIN(DC)*SIN(LT))/(COS(DC)*COS(LT)):HA=ST-RA:A$="26":GOSUB30
2220 DX=VAL(MID$(L$,1,9))/C1:DL=VAL(MID$(L$,12,9))/C1:DY=VAL(MID$(L$,22,9))/C1:
HA=CSNG(HA-(DX*SIN(HA)+DY*COS(HA))*TAN(DC)+DL):DC=CSNG(DC-DX*COS(HA)+DY*SIN(HA))

2240 IF HA>6.2831853 THEN HA=HA-6.2831853:GOTO 2240
2250 IF DC>6.2831853 THEN DC=DC-6.2831853:GOTO 2250
2280 RETURN
2290 A$="12":C$="":GOSUB30:LH$=L$:GOSUB2000:IFII=1GOTO2340ELSEII=II-1:GOTO2350

2295 REM
2340 II=II+1
2350 HI(II,1)=(VAL(MID$(LH$,1,9))/C1):HI(II,2)=(VAL(MID$(LH$,11,9))/C1):HI(II,3
)= HA:HI(II,4)=DC:HI(II,5)=HI(II,1)-HI(II,3):HI(II,6)=HI(II,2)-HI(II,4):RETURN
2720 IF HI(1,6)=0 OR HI(2,6)=0 THEN PRINT@40,"ERROR:REDOING GUIDESTARS. PRESS <
ENTER>";:GOSUB5020:X9=6:CNT=0:GOTO3000
2722 IF ABS(HI(1,6))>ABS(HI(2,6)) THEN 2730 ELSE 2723
2723 FOR I=1TO6
2724 TEMP=HI(1,I):HI(1,I)=HI(2,I):HI(2,I)=TEMP:NEXTI
2730 D=HI(2,6)/HI(1,6):GOTO 2800
2800 FORI=1TO2
2810 IFHI(I,5)<4.0GOTO2830ELSEHI(I,5)=HI(I,5)-6.283185
2830 NEXT I
2840 F=(D*SIN(HI(1,3))-SIN(HI(2,3)))/(D*COS(HI(1,3))-COS(HI(2,3))):Y=(HI(2,5)-H
I(1,5))/((F*SIN(HI(1,3))+COS(HI(1,3)))*TAN(HI(1,4))-(F*SIN(HI(2,3))+COS(HI(2,3)))
)*TAN(HI(2,4)))
2850 X=F*Y
2870 T=(HI(1,5)+(X*SIN(HI(1,3))+Y*COS(HI(1,3)))*TAN(HI(1,4))+(HI(2,5)+(X*SIN(H
I(2,3))+Y*COS(HI(2,3)))*TAN(HI(2,4)))/2
2880 DX=CSNG(X*C1):X=CSNG(X*KR):DY=CSNG(Y*C1):Y=CSNG(Y*KR):DL=CSNG(T*C1):XT=T:M
T=(XT*229.1851):SCT=(MT-FIX(MT))*60:CLS:GOSUB 9000:
2885 A$="27"+STR$(DX)+"/"+STR$(DL)+"/"+STR$(DY)+"/":GOSUB30:RETURN
```

```
3000 CLS:FG=0:GD$="G":K$="":E0=2000:A$="270/0/0/":GOSUB30:INFO$="":K$="":IF X9>
     80RX9<6THENCLS:BEEP:PRINT "DO YOU WISH TO PICK YOUR OWN GUIDE STAR? . . .Y/N ";:
     GOSUB5030:IF R$="Y"ORR$="y" THEN 3020 ELSEX9=6:GOTO3045
3010 GOTO 3045
3020 CLS:PRINT "DO YOU WISH TO ENTER GUIDE STAR'S COORDINATES. . .Y/N? ";:GOSUB
     5030:IF R$="Y" OR R$="y" THEN F=1:GOSUB 5000:F=0:IFLT<.08THEN3020ELSE3065
3030 CLS:PRINT "DO YOU WISH TO ENTER GUIDE STAR NUMBER. . .Y/N? ";:GOSUB5030:IF
     R$="Y" OR R$="y"THEN EX$="GUIDE STAR ":F=1:T$="2":SL$="/":JM$="11":GOSUB 4060:F
     =0:GOTO3065
3040 GOTO 3000
3045 GOSUB6000
3050 A$="0"+RIGHT$(STR$(X9),1)+STR$(ST#C1)+"/":CMD$=A$:GOSUB 30
3060 RF=VAL(MID$(L$,1,9))/C1:DF=VAL(MID$(L$,11,9))/C1:INFO$=MID$(L$,21,25):GOSU
     B3500:X9=X9+1:FG=0
3065 IF K$="0" THEN 3000
3070 GOSUB5900:BEEP:PRINT@40, "    STORE DATA FOR THIS STAR. . .Y/N ";:PRINT @ 8
     0,STRING$(40,"*"):PRINT@ 78,"";:GOSUB5030:IF R$="Y" OR R$="y"THEN CNT=CNT+1:GOSU
     B2290
3080 IF CNT=2 THENGOSUB2720:RETURN
3081 GOTO 3000
3500 GOSUB2000:GOSUB8900:IFLT<.08THENRETURNELSEIFFG=2GOTO3500ELSEPRINT@ 40,SPAC
     E$(40)):BEEP:PRINT@40,"           POINT Y/N? ":PRINT@80,STRING$(40,"*"):PRIN
     T@67,"";:GOSUB5030:IF R$="Y" OR R$="y" THEN FG=2:K$="1":GOTO3500
3505 K$="0":GOTO3600
3508 BEEP:PRINT@40,SPACE$(40));PRINT@40,"              POINTING NOW";:PRINT@80,ST
     RING$(40,"*")):   A$="20"+STR$(HA#C1)+"/"+STR$(DC#C1)+"/":GOSUB30:IFA$="05"THEN351
     0ELSEPRINT@40,"          POINT COMPLETED ":
3509 FORI=1TO100:NEXTI:RETURN
3510 CLS:BEEP:PRINT"POINT ABORTED":K$="0":FORI=1TO300:NEXTI:FG=0:RETURN
3600 FG=0:RETURN
4000 E0=2000:FG=0:K$="":INFO$="":L$="":GD$=""
4010 CLS:PRINT "DO YOU WISH TO ":PRINT:PRINT "<ENTER> TO ABORT":PRINT"<1> VIEW
     A SINGLE PROCEDURE ":PRINT "<2> VIEW A SINGLE OBSERVATION":PRINT:PRINT "ENTER? "
     ;:LINEINPUTT$
4014 T=VAL(T$)
4020 IF T$="" THEN RETURN
4030 REM
4040 IF T=1 THEN EX$="TOUR ":SL$="/":JM$="09":FG=2:GOTO 4060
4050 IF T=2 THEN EX$="OBJECT":FG=0:SL$="/":JM$="10":GOTO 4060
4055 GOTO 4010
4060 CLS:PRINT "PRESS <ENTER> TO RETURN ";:PRINT"TO PREVIOUS MENU":PRINT "ENTER
     ";EX$;" # ";:LINEINPUT NUM$:IF NUM$=""AND F=1THEN RETURN
4061 IF NUM$=""THEN 4010
4065 IF T=2 THEN FG=0
4070 A$=JM$+NUM$+SL$:GOSUB30:CLS:GOSUB9040
4080 IFT=1 THENGOSUB9040
4081 GOSUB6000:A$="23"+STR$(JO#C1)+"/":GOSUB30:IFLEFT$(L$,1)="8"THEN PRINT@40,S
     PACE$(40):PRINT@40,RIGHT$(L$,LEN(L$)-1):PRINT@0,SPACE$(40):PRINT@80,STRING$(40,"
     *"):GOTO4081
4082 IF L$="" AND GD$="G" THEN RETURN ELSE IF L$="" THEN 4014
4083 IF LEFT$(L$,1)="/" THEN4084ELSE4085
4084 IFLEN(L$)=1 THEN 4080ELSEL$=MID$(L$,2,LEN(L$)-1)+"****  PRESS ANY KEY TO C
     ONTINUE    ":PRINT@0,SPACE$(80));PRINT@40,"****   ";L$;:GOSUB5020:GOTO 4080
4085 IF A$="05" THEN 4080
4090 RF=VAL(MID$(L$,1,9))/C1:DF=VAL(MID$(L$,11,9))/C1:INFO$=MID$(L$,21,25):GOSU
     B 3500:IF T=2 THEN L$="/PAUSING. . . "+CHR$(13)+CHR$(10):GOTO 4083
4091 GOTO 4080
5000 K$="":INFO$="":FG=0:CLS:PRINT:PRINT "PRESS <ENTER> TO RETURN TO PREVIOUS M
     ENU":PRINT "PRESS <1> TO ENTER RA IN HR,MIN,SECS":PRINT "PRESS <2> TO ENTER RA I
     N DECIMAL HRS":GOSUB 5010:IF U$="" THEN RETURN
5001 CLS:PRINT:PRINT "PRESS <3> TO ENTER DEC IN DEG.,MIN,SEC":PRINT "PRESS <4>
     TO ENTER DEC IN DECIMAL DEGREES":GOSUB5010
5002 CLS:PRINT:PRINT "ENTER EPOCH OF OBJECT ";:LINEINPUT E0$:E0=VAL(E0$)
5003 RF=(R0*15)/KR:DF=(D0/KR):GOSUB3500:IF F=1 THEN RETURN
5004 PRINT@ 40,SPACE$(40):PRINT@40,"     PRESS ANY KEY TO CONTINUE ":PRINT@80,S
     TRING$(40,"*"):PRINT@73," ";:CA$=INPUT$(1):GOTO 5000
5010 PRINT@200, "ENTER CHOICE ";:LINEINPUTU$
5012 IF U$="" THEN RETURN
5013 IFVAL(U$)<VAL("1")ORVAL(U$)>VAL("4") THENFORI=1TO6:BEEP:NEXTI:PRINT "INVAL
     ID RESPONSE":GOTO 5010
5015 ON VAL(U$) GOSUB 5100,5150,5200,5250
5018 RETURN
5020 R$=INPUT$(1):RETURN
5030 LINEINPUT R$:RETURN
5100 CLS:PRINT:PRINT "ENTER RA: ";:PRINT@52,"HR ";:PRINT@60,"MIN ";:PRINT@70, "
     SEC ";:PRINT @ 55,"";:LINEINPUTH$:PRINT@65,"";:LINEINPUTMI$:PRINT@75,"";:LINEIN
```

```
PUTS$
5110  R0=VAL(H$)+VAL(MIN$)/60+VAL(S$)/3600:RETURN
5150  CLS:PRINT:PRINT "ENTER RA IN DECIMAL HOURS ";:INPUT R0
5160  RETURN
5200  CLS:PRINT:PRINT "ENTER DEC: ";:PRINT "DEG ";:PRINT#60," MIN ";:PRINT#70,"
 SEC ";:PRINT #55,"";:LINEINPUTH$:PRINT#65,"";:LINEINPUTMIN$:PRINT#75,"";:LINEINP
UTS$
5220  D0=VAL(H$)+VAL(MIN$)/60+VAL(S$)/3600:RETURN
5250  CLS:PRINTPRINT "ENTER DEC IN DECIMAL DEGREES ";:INPUT D0:RETURN
6000  REM SIDERALCALC
6100  A$="03":GOSUB30:Y1=VAL(MID$(L$,3,2)):YR=VAL(MID$(L$,3,2)):M=VAL(MID$(L$,5,
  2)):D=VAL(MID$(L$,7,2)):HR=VAL(MID$(L$,9,2)):MN=VAL(MID$(L$,11,2)):SE=VAL(MID$(L
$,13,2))
6110  LET TM = M
6120  TY = YR
6140  IF TM > 2 THEN GOTO 6180
6150  LET TM = TM + 9
6160  LET TY = TY - 1
6170  GOTO 6200
6180  LET TM = TM - 3
6200  LET J1 = INT (1461 * TY / 4) + INT ((153 * TM + 2) / 5.) + D + 15078
6220  LET J2 = HR / 24 + MN / 1440 + SE / 86400
6230  LET J0 = J1 + J2
6240  REM
6310  LET A = 6.64606556
6320  LET B = 8640184.542
6330  LET BB = 24.
6340  LET DJ = (J1 + J2 - 15019.5) / 36525.
6350  LET AM = A + B * DJ / 3600.
6360  LET GT = AM / BB - INT (AM / BB)
6370  LET ST = 6.2831853 * (J2 + GT) + L
6380  IF ST < 6.2832 THEN GOTO 6410
6390  LET ST = ST - 6.2831853
6400  GOTO 6380
6410  REM
6420  RETURN
6999  REM 5 DATA
8900  CALL17006:REM STATUS REPORT
8910  CLS:PRINT#40,"            TELESCOPE STATUS ";
8920  PRINT#120, "RA = ";CSNG(RF/15*KR));:PRINT # 145,"DEC = ";CSNG(DF*KR));:PRINT
 # 160,"HA = ";CSNG(HA/15*KR));:PRINT #185,"DEC = ";CSNG(DC*KR));:PRINT # 200, "JU
LIAN DATE = ";J0;:PRINT # 240,"SIDERAL TIME IN HOURS = ";CSNG(ST/15*KR));
8930  PRINT # 280,"NAME: ";INFO$;:RETURN
9000  CLS:BEEP:BEEP:PRINT #40,"        MOUNT CORRECTION OFFSETS "
9010  PRINT #120,"X AXIS OFFSET = ";X:PRINT#149," IN DEGREES":PRINT # 160,"Y AX
IS OFFSET = ";Y:PRINT#189," IN DEGREES ":PRINT #200," TIME OFFSET =";ABS(FIX(
MT));" ";ABS(FIX(SCT));"  ";ABS(FIX((FIX(SCT)-SCT)*60)):PRINT#230,"MN,SE,SS"
9020  PRINT #260,"DO YOU WISH TO STORE THIS DATA . .Y/N ";:GOSUB5030:IF R$="Y" O
R R$="y" THEN RETURN ELSE 1265
9040  REM WAIT ROUTINE
9060  CALL17001:PRINT#0,SPACE$(120):PRINT#40,"           W O R K I N G . . .
";:PRINT#80,STRING$(40,"*"):CALL17006:RETURN
                             © 1984 Bausch & Lomb
```

To enable the PC 196 to communicate with the kernel 180, the mount base 26 may be provided with a plug receptacle to receive and connect a ribbon cable 198 (FIG. 1) which is also connected to the PC 196. Disposed at or near the receptacle is an RS 232-type interface 200 depicted in FIG. 8. The interface 200 includes the circuitry providing for level shifting from the RS 232 levels to the +5 V logic levels of the microprocessor kernel 180. Accordingly, via the interface 200 communication is established between the kernel 180 and the PC 196.

As is well known, the relative position of any particular celestial object can be determined if certain variables are established. It follows that for the kernel 180 to determine the location of a particular celestial object it must have inputs sufficient to determine these certain variables and to determine the position of the object in degrees declination and right ascension. Certain of these variables relate to the geographic location of the telescope on the earth. To provide these variables, the PC 196 enables the operator to input data determinative of the geographic location of the telescope. Accordingly, the operator can input via the PC 196 the latitute and longitude of the telescope. These variables can easily be determined from a map or from a setting on the mount 24 as described above.

Along with the inputs necessary to determine the geographic location of the telescope a time input is necessary to enable the control system to determine the position of any selected celestial object in the sky relative to the determined geographic location. To provide such time input, the PC 196 may be used to input the date upon which observation is to take place.

Acting in cooperation with the input from the PC 196 a real time clock 202 may also be provided. As shown in FIG. 8, the clock 202 is powered by a battery 204 and communicates directly with the kernel 180. For convenience, clock 202 and battery 204 may be disposed in the mount 24 or may be otherwise conveniently provided. The real time clock 202 provides conventional 24-hour time input from seconds to tens of years as powered by the battery 204. Within the microprocessor kernel 180, a non-volatile memory provides input to the kernel 180 in hundreds and thousands of years so that for any given date as input from the PC 196 the kernel 180 is capable of determining the location of a desired celestial object given the input corresponding to the celestial location of that object. The clock 202 may be reset via the PC 196.

To enable the control system to accurately determine the position of any celestial object, it is necessary that the control system have a reference position for each of the declination and right ascension axis A and B. To provide this reference input into the control system, and more particularly the processing kernel 180, each of the drive means for the telescope includes means for inputting an initial position into the control system from which all other positions will be determined. With reference to FIGS. 3 and 5, the reference inputing means for the motion of the telescope about the declination axis A includes an LED sensor 206 secured to the yoke 18a, the sensor 206 having an emitter and a receiver arranged so as to pass the occulting disc fin 46 therebetween. When the fin 46 is disposed in the sensor, light emitting from the emitter cannot pass through the fin 46 to the receiver. Accordingly, a signal is not generated by the sensor 206.

When the telescope is pivoted about the declination axis A such that the fin moves out of the eclipsing position allowing the light from the emitter 206 to be received by its cooperating sensor a signal is sent to the kernel 180 indicating a reference position for the telescope. When in the automatic mode, upon energizing the control system the telescope moves to the position as shown in phantom in FIG. 3 whereat the fin first moves from the sensor 206 and a signal is first generated to the kernel 180. This position determines one reference for the motion of the telescope about the declination axis A. As shown in FIG. 3, when a signal is first generated by sensor 206 the control system has a first reference. From this reference, the number of pulses generated and their sequence can be compared by the kernel 180 to determine the position of the telescope. The telescope by comparing the number of pulses to the initial position can be pivoted upwardly through an angle which is represented in FIG. 3 as B-Beta until the other edge 48b of the occulting disc fin 46 eclipses the sensor 206. At such time, the signal from the sensor 206 to the kernel 180 is stopped and no further upward motion is permitted. Accordingly, the telescope is prevented from pivoting too far to a position where the telescope tube 12 would engage the table 20 or to a position where the eyepiece 14 engages the table 20. Again, when in the upright position where edge 48b blocks sensor 206 another reference is established from which the telescope can operate to count pulses and determine the position of the telescope.

In a similar manner, and referring to FIG. 7, a second sensor 208 is provided in the base 26. The second sensor 208 is arranged such that the emitter portion is eclipsed by the occulting disc fin 34 for that angle represented between edges 142a and 142b, i.e., 225°. The angle defined between the edges 142a and 142b, i.e., 155° wherein the fin 134 does not eclipse the sensor 206 is the range within which the telescope pivots about the right ascension axis A. Further, each edge of the fin as it moves from the sensor 208 generates a reference signal to the processing kernel 180 from which pulses may be counted and accounted for to determine the position of the telescope.

To also limit the rotation of the telescope about the right ascension axis A, the base 26 is provided with a post 210 adapted to be engaged by each of the edges 140a and 140b should the telescope, for whatever reason, i.e, under manual or pendant control, pivot past the references established by the fin edges 142a and 142b. By so engaging the post 210, overextension or reverse extension of the negator spring 152 is prevented.

Turning now to FIG. 9, the operation of the telescope control system will now be described. When the telescope control system is first energized from a power source, the kernel 180 initiates a start sequence 220 shown in block form in FIG. 9. The start sequence 220 pivots the telescope upwardly or downwardly about the declination axis A and either eastwardly or westwardly about the right ascension axis B until references are established via the cooperation between the first and second sensors 206 and 208 and the fins 46 and 134 for the occulting discs. Further, the kernel 180 generates input prompts to the operator requesting information such as degrees latitude and degrees longitude of the telescope and the date. This sequence is indicated by prompt input 222. At the same time, clock 202 is providing a time input in conjunction with the typed in date input from the PC 196 enabling the kernel 180 to determine the variables necessary for the operation of the control system. From prompt input 222 the control system enters a prompt calibrate/sequence 224. The prompt/calibrate sequence 224 relies in part upon an electrically erasable, programmable read only memory EEPROM 226 which contains data corresponding to the location of a selected number, for example, five highly visible celestial objects. An example would be the bright star Sirius in the constellation Canis Major. If the operator elects to calibrate the control system for automatic operation of the telescope, the EEPROM 226 will display on PC display 198 a listing of the celestial objects contained in its memory for selection by the operator. Upon selecting a particular object such as Sirius, the operator inputs via PC 196 the prompt corresponding to that star, as shown by select line 228 in FIG. 9, which prompts the processing kernel 180 to receive and process the corresponding data from EEPROM 226. Under such control, the kernel 180 from the telescope index positions, and given the location, time and date, generates a number of pulses at a rate as determined by the kernel 180. The kernel 180 issues those pulses in the proper sequence to each of the right ascension drive means and declination drive means schematically illustrated in FIG. 9 as stepper motors 144 and 74. After the telescope has ceased its movement as controlled by the kernel 180, the observer looks through the telescope to determine whether in fact the designated object, here Sirius, appears in the field of view. This step is indicated by box 229. If the star does appear in the field of view, calibration has been verified for one of the stars whose location is registered in the EEPROM 226. After calibration has been verified the observer may, via the PC 196 or a pendant button, prompt the control system to redisplay the objects whose positions are retained in the EEPROM 226 for selection of another object. The operator may then, by selecting two or three objects in sequence, verify the calibration of the telescope in the automatic mode and may view each of the objects whose position is recorded in EEPROM 226.

If, on the other hand, any one of the selected objects from the EEPROM 226 does not appear in the telescope field of view, pendant 184 may be used to adjust the position of the telescope until that object does in fact appear in the field of view. During the adjustment of the position of the telescope, the pulses required for calibration and their sequence are processed by a subroutine in the kernel 180 which calculates small connections to pointing. These connections will be taken into account when further objects are selected for view. Once calibrated, the operator need only prompt the control means via PC 196 or pendant 184 to view each of the objects whose position has been stored in the EEPROM 226 as shown by view catalog sequence 238. It should be noted that once the particular object is in view the track button 188 on the pendant 184 may be depressed to cause the telescope to track that object at a sidereal rate. Further, the pendant may be provided with a pair of buttons 232a and 232b to enable the observer via hand held pendant 184 to proceed in sequence through the list of celestial objects contained within EEPROM 226. For example, button 232a may send a prompting signal to the kernal 180 causing it to select from the EEPROM 226 the next celestial object in the list contained therein. Button 232b, on the other hand, may prompt the Kernel 180 to repeat the sequence permitting the view of the same celestial object again. Further, button 234 may also be provided.

Returning to FIG. 9, it should be noted that if at during the prompt/calibrate sequence 224 the operator desires manual, pendant control, pendant control may be selected by suitable response from the PC 196 giving the operator manual control over the kernel 180 and the drive means as shown by line 235.

In view catalog sequence 238 the operator selects from a list of celestial objects stored within either the EEPROM 226 or within a cartridge-type tour ROM shown in FIG. 1 as cartridge 240 and schematically illustrated in FIG. 8. While the EEPROM 226 may contain the information necessary to establish the positions of a particular set of stars or celestial objects, tour ROM cartridges may be provided with the data necessary for viewing larger or specific sets of celestial objects. In either case, whether under operation from the tour ROM cartridge 240 or EEPROM 226, the kernal 180 issues a display to the PC 196 soliciting a selection by the operator from the list. When a particular object is selected, as illustrated at 242 in FIG. 9, the kernel 180 is caused to issue control pulses in the correct sequence to either or both of the right ascension and declination drive means shown as stepper motors 74 and 144. Once the selected object is in view, the tracking sequence is initiated to keep the object in view for, for example, a predetermined length of time. If, in fact, the object does not appear in view as indicated and verified at 244, the pendant 184 may be used to adjust the position of the telescope. During use of the pendant 184, as set forth above, the pulses and their sequence are accounted for by the kernel 180. If, on the other hand, the object is in view, it will stay in view due to the tracking sequence for the selected period of time or until a prompt as by depressing the next button 232a on the pendant 184.

At such time, the next celestial object in the sequence contained in the memory of the EEPROM 226 or tour ROM cartridge 240 will be brought into view as the kernel 180 appropriately controls the drive means for the telescope.

Regarding the tracking aspects, it should be noted that the tour ROM cartridge 240 may be provided with commands to adjust the pulse rate generated by the kernal 180 and issued to the right ascension drive means so that tracking proceeds at a solar, planetary or other non-sidereal rate. In this fashion, should the tour ROM cartridge 240 contain the data to enable the kernel 180 to bring a planet such as Mars into view, the tour ROM may be provided with data to enable the processor kernel 180 to track Mars at the proper, non-sidereal rate to keep that planet in view. Further, the rate of tracking may be altered by suitable commands entered into the PC 196.

At the end of the program, or upon the entry of a discontinuing command, via the PC 196 or perhaps from the pendant 184 the control enters a discontinue sequence 246 to the processor and eventually a stop command 248. At such time, the control system is disabled.

As can be appreciated, the control system as set forth above provides for the automatic control of the telescope to view celestial objects contained either within the memory of the EEPROM 226 or within a selected tour cartridge 240. These two cartridges may be generated to for example view constellations in the Northern Hemisphere, and to view certain celestial events such as comets or the like. The cartridges 240 may be updated from time to time to keep up with certain celestial events.

While we have shown and described certain embodiments of the present invention, it is to be understood that it is subject to many modifications without departing from the spirit and scope of the attached claims. For example, the telescope control system may operate on an altitude azimuth system and the control components may be variously embodied.

What is claimed is:

1. A control for a telescope mounted for pivotal motion about at least one axis, the control comprising:
    means for driving the telescope to pivot about the axis, said driving means including a stepper motor coupled to the telescope to pivot the telescope about said axes in discrete, stepped increments, each increment corresponding to a control pulse issued to the driving means;
    means for issuing an index signal when the telescope is at a reference position; and
    means for generating control pulses and issuing said pulses to the driving means for controlling the telescope to pivot about the axis, said control means including means for accounting for pulses issued relative to said reference position to control the position of the telescope.

2. The control of claim 1 wherein the generating means is adapted to issue a first type control pulse and a second type control pulse, the stepped drive transforming each first type control pulse into an increment of pivot in a first direction and each second type control pulse into an increment of pivot in a second direction.

3. The control of claim 1 wherein the stepper motor drives a shaft having a pinion, the pinion meshing with a gear coupled to the telescope, each control pulse incrementally rotating the shaft, pinion and gear and telescope.

4. The control of claim 3 further including means for preventing backlash between said pinion and gear.

5. The control of claim 4 wherein the backlash preventing means includes means for imposing a rotational bias on either of said gear and pinion.

6. The control of claim 1 wherein the pulse generating and issuing means includes a microprocessor adapted to, in response to a control command, generate and issue each control pulse.

7. The control of claim 6 wherein the microprocessor is also adapted to generate and issue a plurality of control pulses at a rate to pivot the telescope at an angular rate corresponding to the control pulse rate.

8. The control of claim 7 wherein the incremental pivot per each control pulse is on the order of or less than 2, arc-sec such that said angular rate approximates a continuous pivot for the telescope.

9. The control of claim 6 wherein the microprocessor is programmable.

10. A control for a telescope mounted to pivot about each of a declination axis and right ascension axis, the control comprising:
   first means for driving the telescope to pivot about the declination axis in discrete, stepped increments, each increment corresponding to a control pulse received by the first driving means;
   means for establishing and generating an index signal when the telescope is at an index declination position;
   second means for driving the telescope to pivot about the right ascension axis in discrete, stepped increments, each increment corresponding to a control pulse received by the second driving means;
   means for establishing and generating an index signal when the telescope is at an index ascension position;
   means for generating and issuing control pulses to each of the first and second driving means from the respective index positions to pivot the telescope about each of the axes to a selected position.

11. The control of claim 10 wherein the establishing means includes a fixed sensor and activating means coupled to the driving means, said activating means interacting with the sensor at at least one index position to generate said index signal.

12. The control of claim 10 wherein the establishing means includes a sensor having a fixed first element and a second element coupled to the driving means, said first and second element interacting at the index position to generate the index signal.

13. The control of claim 12 including a microprocessor with a memory which includes data corresponding to the positions of a plurality of objects relative to the index position, the microprocessor upon command generating and issuing a number of pulses derived from said data to each of the driving means to position the telescope for viewing a selected object.

14. The control of claim 13 wherein the control further includes means for adjusting the position of the telescope to assure said selected object is in view, the microprocessor generating and issuing pulses in response to the adjusting means, the microprocessor also including means for processing said adjustment and altering the data corresponding to the position of objects to be subsequently viewed for viewing said objects.

15. A control for a telescope mounted to pivot about each of a right ascension and declination axes, the control comprising:
   first means for driving the telescope to pivot about the declination axis in discrete, stepped increments, each increment corresponding to a control pulse;
   means for establishing and generating an index signal when the telescope is at an index declination position;
   second means for driving the telescope to pivot about the right ascension axis in discrete, stepped increments each increment corresponding to a control pulse; and
   means for establishing and generating an index signal when the telescope is at an index ascension position;
   a microprocessor having a memory storing data representing the relative positions in said increments of at least two objects from the respective index positions, the microprocessor adapted to generate and issue a number of pulses to each of the driving means derived from said data to position the telescope from said index positions for viewing a selected one of the objects.

16. A control for a telescope mounted for pivotal motion about at least one axis, the control comprising:
   an electric stepper motor having a pinion meshing with a gear coupled to the telescope to pivot the telescope about the axis in discrete, stepped increments, each increment corresponding to a control pulse issued to the motor;
   a spring having a constant spring rate imposing a bias on either of said gear and pinion to prevent backlash; and
   means for generating control pulses and issuing said pulses to the driving means for controlling the telescope to pivot about the axis.

17. The control of claim 16 wherein the spring is a negator spring.

18. The control of claim 1 wherein the issuing means includes an occulting disk coupled to pivot with the telescope and a light source and photosensing means generating a signal when receiving light from said source, said occulting disk having a fin interposed between the source and photosensing means, at said reference position said fin revealing the light source to the photosensing means so that an index signal is generated thereat.

* * * * *